United States Patent Office 3,801,669
Patented Apr. 2, 1974

3,801,669
PURIFICATION OF HYDROCARBONS
Harold F. Christmann, Seabrook, Tex., assignor to Petro-Tex Chemical Corporation, Houston, Tex.
No Drawing. Filed Feb. 3, 1972, Ser. No. 223,364
Int. Cl. C07c 7/00
U.S. Cl. 260—680 E
17 Claims

ABSTRACT OF THE DISCLOSURE

Gaseous streams containing carbonyl compounds are reduced in carbonyl compounds by reacting a vapor phase with catalyst comprising cement. Reactor effluent from oxidative dehydrogenation reaction to produce butadiene-1,3 is reacted with portland cement catalyst to remove carbonyl compounds.

---

This application relates to a process for the reduction in carbonyl impurities in gaseous streams. A preferred embodiment relates to a process for the purification of unsaturated hydrocarbons from a gaseous mixture containing hydrocarbons, relatively non-condensable gases and carbonyl compounds as an impurity.

Unsaturated hydrocarbons are commercially produced by the catalytic dehydrogenation of more saturated hydrocarbons. For example, diolefins are produced in large quantities by the dehydrogenation of saturated hydrocarbons or olefins.

Improved processes for the preparation of unsaturated hydrocarbons such as butene, butadiene-1,3-isoprene and styrene are processes whereby hydrocarbons such as butane, butene, isopentenes or ethyl benzene are dehydrogenated at elevated temperatures in the presence of catalysts and oxygen and such processes are known as oxidative dehydrogenation processes. Superior results and yields of product are thereby obtained. However, the product streams contain not only the desired unsaturated hydrocarbon, but also various oxygenated compounds such as aldehydes and other carbonyl compounds. When air is used as the source of the oxygen, the effluent from the dehydrogenation reactor will contain large quantities of relatively non-condensable gases, such as nitrogen. The gaseous effluent may also contain varying amounts of steam. It is one of the principal objects of this invention to provide a process for the separation of the carbonyl and other oxygenated compounds from the gaseous stream containing hydrocarbons.

The oxygenated compounds are a serious contaminant in the unsaturated hydrocarbon product and must be essentially completely removed in order to have a product of suitable purity, e.g., a product having on the order of a few parts per million carbonyl compounds. The essentially complete removal of the oxygenated compound is quite difficult for several reasons. In the first place, the oxygenated compounds constitute only a very minor percentage of the gaseous stream to be purified. Normally, the carbonyl compounds will constitute less than 5 mol percent of the gaseous stream to be purified and more usually may constitute such as less than or up to 2.5 mol percent of the gaseous stream. Generally, the feed stream will contain at least about 10 p.p.m. carbonyl compounds based on the other organic compounds such as hydrocarbons. The oxygenated compounds are therefore quite difficult to remove because of their low concentrations in the gaseous stream. In addition, the oxygenated compounds may be difficult to separate from compounds such as hydrocarbons regardless of their relative concentration. Azeotropes may form between the oxygenated compounds and various hydrocarbons. For instance, an azeotrope is formed between acetaldehyde and butadiene1,3. It is therefore an object of this invention to promote a process for the removal of carbonyl compounds from a gaseous stream containing only minute quantities of carbonyl compounds based on the total gaseous stream.

Prior processes have dealt with the separation of oxygenated compounds from oxidative dehydrogenation processes. In U.S. 3,308,201 and U.S. 3,336,414 oxygenated compounds are removed by scrubbing with an aqueous composition. These processes have the drawback that the carbonyl compounds are transferred to a scrubbing water and must still be disposed of such as biodegradation. According to U.S. 3,557,238 the carbonyl compounds are condensed with the stream from the reactor effluent, revaporized and fed back to the dehydrogenation reactor. Therefore, one object of this invention is to provide a process for the destruction of carbonyl compounds. It is a further object to destroy the carbonyl compounds without significantly losing reactor product or significantly isomerizing any of the products. It is also an object to produce a catalyst which has long catalyst life and which has a reduced tendency to form coke. Another object is to provide a process which is particularly effective in destroying formaldehyde because formaldehyde is difficult to economically separate from aqueous compositions.

According to this invention it has been discovered that catalysts comprising cement catalyze the destruction of oxygenated compounds in vapor phase. Thus, it is possible to contact the reactor effluent directly with a catalyst bed and destroy oxygenated compounds.

Cements are combinations of calcium, aluminum and silica as main ingredients and may be prepared e.g. by the sintering of a mixture of calcium carbonate, (as limestone) with an aluminum silicate. The cements include those known as high alumina, natural and portland with the portland cements being particularly preferred. Cements are discussed on pages 684–696 volume 4 of Kirk-Othmer, Encyclopedia of Chemical Technology, 2nd edition (1964), which disclosure is hereby incorporated by reference. Portland cements are classified by Types I, II, III, IV and V (ASTM C 150–63) and a preferred type according to this invention is Type III. Typical cements would have by weight from about 15 or 20 to 25 or 30 percent silicon analyzed as $SiO_2$, from about 2 to 6 or 8 percent aluminum analyzed as $Al_2O_3$ (or up to about 45 percent for the high alumina cements, and from about 55 or 60 to 66 or 70 weight percent calcium analyzed as CaO (or down to about 30 percent CaA for the high alumina cements). The cements may also contain minor ingredients such as MgO and $SO_3$. The specification for Type III portland is that is have by weight a maximum of 5 percent MgO; when the $3CaO \cdot Al_2O_3$ is 8 percent or less the $SO_3$ should be at a maximum of 3.0 percent and when the $3CaO \cdot Al_2O_3$ is more than 8 percent the $SO_3$ should be 4.0 percent maximum; the loss on ignition is 3 percent maximum and the insoluble residue is 0.75 percent maximum.

Alkali metals may be preferably present in an amount up to 40 weight percent of the other metallic elements (calculated as the element) but normally will range from about .5 to 30 weight percent. The preferred alkalis are potassium, sodium, rubidium, lithium and mixtures. Aluminum can be present in fairly large amounts but the exact function of aluminum is not known as aluminum by itself does not particularly catalyze the reaction. Non metals such as silica or phosphorus can be present. Ingredients or anions which suppress or deactivate the effect of the cement should be avoided. Oxides, hydroxides, carbonates or compounds which are converted to these compounds under the conditions of reaction to destroy the carbonyl compounds are preferred.

The catalysts of this invention may be used as such or may be coated on catalyst carriers. Catalyst carriers are known in the art and include such compounds as alumina, silica, silicon carbide and so forth. Diluents may also be incorporated into the catalyst so long as the diluent does not prevent the catalyst from functioning. Preferably the carrier should be low surface and low acidity.

The gaseous mixture to be treated containing the carbonyl [1] compounds as an impurity may be obtained from a variety of sources. However, the invention is particularly suitable for the purification of gaseous effluents resulting from the oxidative dehydrogenation of organic compounds including hydrocarbons utilizing air or oxygen diluted with non-condensable diluents such as nitrogen or helium. Examples of oxidative dehydrogenation processes are disclosed, e.g. in U.S. 3,207,805; U.S. 3,284,536; U.S. 3,320,329; U.S. 3,342,890; and U.S. 3,476,924.

Organic compounds to be dehydrogenated may be acyclic, cycloaliphatic or alkyl aryl compounds of 3 to 4 to 9 carbon atoms, which contain at least two adjacent carbon atoms, each of which carbon atom has at least one hydrogen atom attached. The dehydrogenation will produce compounds having double and/or triple bonds. Thus, butadiene-1,3 and/or vinyl acetylene may be produced from butene-1 or butene-2 or mixtures thereof, and isoprene may be produced from any of the methyl butenes, such as 2-methyl butene-1, 2-methyl butene-2 or 3-methyl butene-1 or mixtures thereof. Isoprene may also be produced from methyl butanes, such as 2-methyl butane. Olefins and diolefins may be produced from saturated hydrocarbons; for example, vinyl acetylene, butadiene and butene or mixtures thereof may be produced from n-butane. A mixture of monoolefins and diolefins may also be produced such as a mixture of butadiene-1,3 and butenes from a feedstock of a mixture of n-butane and butene. Cyclohexane may be dehydrogenated to cyclohexene and/or benzene. Ethyl benzene or ethyl cyclohexane may be dehydrogenated to styrene. Good results may be obtained with an organic feed containing at least 50, such as at least 75, mol percent of an acyclic aliphatic hydrocarbon. Hydrocarbons of 4 to 5 carbon atoms having a straight chain of at least four carbon atoms, e.g. those having a single double bond have been used and preferred are the monoethylenically unsaturated compounds or mixtures of saturated and monoethylenically unsaturated compounds. Hydrocarbons having from 4 to 8 carbon atoms constitute a preferred feed with n-butane, n-butene, isopentane, isopentene, ethyl benzene and mixtures having given excellent results.

Oxygen will generally be supplied to the dehydrogenation zone in the range of about 0.20 mol of oxygen to 2.0 or 3.0 mols of oxygen per mol of hydrocarbon to be dehydrogenated. A preferred range for the oxygen is from about 0.3 to 1.50 mols of oxygen per mol of hydrocarbon to be dehydrogenated. Either air, oxygen or oxygen diluted with a diluent such as nitrogen, helium, and the like, may be utilized. The oxygen may be supplied in gaseous form or via a solid oxygen carrier such as in U.S. 3,420,911. Steam may be fed to the dehydrogenation zone in amounts such as from about 2 to 40 mols of steam per mol of hydrocarbon to be dehydrogenated. An advantageous range is from 2 to 20 mols of steam per mol of hydrocarbon.

The dehydrogenation reaction may be conducted in the absence of contact catalysts, but better results are obtained if the reaction is conducted in the presence of metal or metal compound catalysts. The dehydrogenation reactor may be a fixed or fluid bed reactor. Reactors conventionally used for the dehydrogenation of hydrocarbons to butadiene may be employed. The total pressure in the dehydrogenation zone may suitably be about atmospheric pressure. However, higher pressures or vacuum may be used. Pressures such as from about atmospheric (or below) up to about 100 to 200 p.s.i.g. may be employed. The dehydrogenation reaction will normally be conducted at a temperature at least about 250° C. such as greater than about 300° C. or 375° C. and the maximum temperature in the reactor may be about 700° C. or 800° C. or perhaps higher such as 900° C.

The effluent from the dehydrogenation zone will contain the impure unsaturated organic products, various impurities including oxygenated hydrocarbons, noncondensable [2] gases and perhaps some unconverted feed, oxygen and steam. If air is used as the source of oxygen, nitrogen will be present in relatively large quantities as a noncondensable gas. Steam may be present in an amount up to 96 mol percent of the total effluent, such as from about 5 to 96 percent. On a water free basis the organic phase including dehydrogenated product, any unreacted feed, oxygenated hydrocarbons, polymer and tar and precursors thereof and any organic decomposition products usually range from about 1 to 50 mol percent of the effluent and generally will be within the range of or about 3 to 30 mol percent of the effluent. Also on a water free basis the noncondensable gases, such as nitrogen or $CO_2$, will usually be present in an amount of from or about 20 to 93 mol percent of the total effluent, but more often will be within the range of about 40 to 80 mol percent.

The effluent gases leaving the dehydrogenation zone will generally be at a temperature of at least 400° C. or 450° C. with suitable ranges being between 450° C. or 500° C. and 800° to 900° C. depending upon the particular dehydrogenation process. According to the preferred embodiment of this invention the gases are fed directly into the catalyst bed to the destruction of oxygenated compounds or at least are fed to the catalyst bed prior to condensation of steam from the effluent gases. This catalyst bed may be incorporated into the same reactor chamber as the dehydrogenation bed, e.g. packing material may optionally be added between the dehydrogenation catalyst and the carbonyl destruction catalyst. Generally, the reactor effluent will not cool appreciably before the carbonyl destruction catalyst is encountered and, therefore, the temperature will be within the same ranges as for the reactor effluent. Optionally, prior to contacting with the carbonyl destruction catalyst the gaseous feed may be cooled or heated to give an optimum temperature for carbonyl destruction without adversely affecting the product. Also, it is within the scope of the invention to remove portions or components of the reactor effluent prior to contacting with the catalyst. Normally the composition fed to the carbonyl destruction catalyst will contain at least 3 or 5 mols of uncondensed steam per mol of total organic compound such as hydrocarbon and may contain e.g. from 3 to 30 mols of steam. The reactor effluent will generally contain less than 5 mol percent free oxygen and may initially contain less than one mol percent of the reactor effluent. It is possible to add oxygen to the reactor effluent prior to contacting with the carbonyl destruction catalyst such as adding e.g. up to five mols of oxygen per mol of carbonyl compound but care should be exercised to avoid the explosive limits.

The gaseous composition to be fed to the carbonyl destruction catalyst zone will preferably comprise, exclusive of any water present, about or from 3.5 to 80 mol percent of unsaturated hydrocarbon, about or from 0.005 to 2.5 mol percent of carbonyl compounds, and about or from 20 to 93 mol percent of noncondensable gases (i.e., noncondensable under the conditions of contact with the catalyst), all based on the total mols of gaseous composition being fed to the catalyst.

---

[1] All references to overall quantities of carbonyl compounds are determined by ASTM Method D-1089 and reported as acetaldehyde. The procedure is modified to exclude the analysis of acetals. Generally, the carbonyl compounds will have from 1 to 8 carbon atoms, e.g. from 1 to 6 carbon atoms when a $C_4$ to $C_6$ compound is being dehydrogenated, and will have from 1 to 2 carbonyl groups. Formaldehyde is included in this definition.

[2] The term "noncondensable" or "inert noncondensable" gases refers to those gases, other than hydrocarbons, such as nitrogen, $CO_2$ and CO, which do not condense under the conditions encountered.

After the catalyst has been used for a period of time it may be regenerated such as by oxidation with air and/or with steam. Procedures for the regeneration of dehydrogenation catalysts to remove coke may be employed.

The following examples are only illustrative and are not intended to limit the invention. All percentages are by weight unless expressed otherwise.

EXAMPLES 1–19

A series of runs is made to illustrate the effect of certain catalysts on the destruction of carbonyl compounds in an effluent stream containing unsaturated hydrocarbons. In each instance 25 cc. of catalyst of 6 to 8 mesh (U.S. Standard) is employed in a one inch Vycor reactor. The reactor temperature is controlled within the range of 555 to 575° C. The feed to the reactor is a mixture of 6 ml./min. of liquid carbonyl mixture of 0.3% by weight of 50%–50% by weight mixture of formaldehyde and acetaldehyde which is vaporized by passing through a steam generator, 930 ml./min. of gaseous nitrogen, and 575 ml./min. of gaseous butadiene-1,3 with the gaseous volumes being calculated at 760 mm. and 0° C. In the runs in which $CO_2$ is also added the carbonyl mixture is still fed at a rate of 6 ml. per minute but the nitrogen is 720 ml./min., the butadiene-1,3 is 575 ml./min. and the $CO_2$ is 210 ml./min. In all of these feeds steam is present in an amount of 13 mols per mol of hydrocarbon. The contact time of the feed with the catalyst is about .05 second. The percent removal of carbonyl compounds is analyzed by the hydroxylamine·HCl method, calculated on feed and effluent as $CH_3CHO$ (reference, Analytical Chem., vol. 23, 1758). In the runs where a carrier is employed the present carrier is the percent by weight based on the total weight of carrier and actives. The alumina carrier is an aluminum oxide carrier type AMC of 6 to 8 mesh (U.S. Standard). The ingredients in the catalyst are by weight percent. In some runs the catalyst is deliberately coated with coke to determine how well it performs under these adverse conditions which might be encountered on prolonged operation. The $CO_2$ is added in some runs to stimulate this adverse conditions of the feed.

| Example | Weight percent Catalyst | Carrier | $CO_2$ present | Percent carbonyl removal |
|---|---|---|---|---|
| 1 | 97 portland cement type III, 3 $K_2CO_3$. | | No | |
| 2 | Portland cement type III | | No | 90 |
| 3 | Quartz chips | | No | 0 |
| 4 | SAS 350 $Al_2O_3$ | | No | 0 |
| 5 | 90 portland type III, 10 $K_2CO_3$. | | No | 83 |
| 6 | 90 portland type III, 10 $K_2CO_3$ (pre-coked). | | No | [1] 69–86 |
| 7 | do | | Yes | 69 |
| 8 | do | | Yes | [2] 82 |
| 9 | 70 portland cement type III, 30 $K_2CO_3$ (pre-coked). | | Yes | 54 |
| 10 | 70 portland cement type III, 30 $K_2CO_3$ (Example 7 regenerated with steam). | | Yes | 75 |
| 11 | do | | No | 90 |
| 12 | Portland cement III, $K_2CO_3$, sand.[3] | | No | 92 |
| 13 | do.[3] | | Yes | 64 |
| 14 | 75 portland cement III, 10.0 $K_2CO_3$, 5 $Cr_2O_3$. | 50 alumina | Yes | 64 |
| 15 | 70 portland cement III, 30 $Li_2CO_3$. | | Yes | 83 |
| 16 | do | | Yes | 66 |
| 17 | 80 portland cement type III, 10 $K_2CO_3$, 10 NaCl. | | No | |
| 18 | 40 high alumina cement,[4] 10 $Rb_2CO_3$. | 50 alumina | No | |
| 19 | 75 portland III, 20 $K_2CO_3$, 5 $Cr_2O_3$. | | Yes | 15 |

[1] Values for Example 6 increased with repeated runs suggesting removal of coke.
[2] Run at 600° C.
[3] Mixture of 50 percent by volume of 70 percent by weight portland cement type III and 30 percent by weight $K_2CO_3$ and 50 percent by volume of mortar sand.
[4] High alumina cement (5.3 $SiO_2$, 39.8 $Al_2O_3$, 14.6 $Fe_2O_3$, 33.5 CaO, 1.3 MgO, 0.1 $SO_2$, 0 loss, 4.8 insol.).

EXAMPLES 20 TO 22

A series of runs is made feeding a vaporized mixture of 6 liquid ml. per minute of 0.3% by weight mixture of 50% formaldehyde and 50% acetaldehyde and 1500 cc. gaseous nitrogen per minute through a 25 cc. catalyst bed of 6 to 8 mesh size. Runs are made from 4.2 to 8.2 minutes. The reactor is Vycor and the catalyst temperature is 540 to 575° C. Percentages are by weight.

| Example | Weight percent Catalyst | Carrier | Percent carbonyl removal |
|---|---|---|---|
| 20 | Quartz chips | | <1 |
| 21 | 90 portland cement III,[1] 10 ZnO | | 83 |
| 22 | 95 portland cement III, 5 $Na_5P_3O_{10}$ | | 90 |

Portland cement, type III. Approximate analysis 20.4% $SiO_2$, 5.9% $Al_2O_3$, 3.1% $Fe_2O_3$, 64.3% CaO, 2.0% MgO and 2.3% $SO_3$.

A run is made to determine the effect of the catalyst of this invention on unsaturated hydrocarbon products being fed to the catalyst for carbonyl removal. In order to be efficient the catalyst should not only be efficient in removing carbonyls but should not be destructive of the unsaturated products being fed to the carbonyl removal catalyst. For example, in the case of the oxidative dehydrogenation of butylenes to butadiene the effluent contains butadiene contaminated with carbonyl compounds and the effluent from this reaction can be fed to the catalyst for the removal of carbonyl compounds. The catalyst for the removal of the carbonyl compounds should selectively destroy carbonyl compounds but preferably does not destroy butadiene.

EXAMPLE 23

Butene-2 is oxidatively dehydrogenated to butadiene-1,3 by feeding a mixture of 20.0 mols of steam and 0.6 mols of oxygen (as air) per mol of butene-2 to an oxidative dehydrogenation catalyst. The dehydrogenation effluent contains butadiene in a mol percent conversion of 62.0 percent, mol percent selectivity of 92.9 percent and a mol percent yield of 57.6 percent of butadiene based on the butene-2 fed to the reactor. This effluent is fed directly to the carbonyl recomal catalyst consisting by weight of 70 percent portland cement Type III, 20 percent $K_2CO_3$ and 10 percent ZnO. The effluent from the carbonyl removal catalyst is again checked for butadiene-1,3 and the butadiene product is calculated based on the butene-2 fed to the dehydrogenation reactor. Under these circumstances the conversion of butene-2 is 61.4 mol percent, the selectivity is 94.0 and the yield is 57.7 percent butadiene. The percent carbonyls removed are 60 percent, thus, illustrating that a high percentage of the carbonyls are removed and at the same time a high selectivity and yield of butadiene is still achieved after passing through the carbonyl removal catalyst.

The invention claimed is:

1. In a process for the oxidative dehydrogenation of hydrocarbon compounds to produce a composition comprising carbonyl compounds as an impurity the improvement comprising reducing said carbonyl compounds after the said hydrocarbon compounds have been dehydrogenated by reacting said composition in vapor phase with a catalyst in contact with said composition comprising cement said cement having from about 15 to 30 percent silicon analyzed as $SiO_2$ from about 2 to 45 percent aluminum analyzed as $Al_2O_3$ and from about 30 to 70 percent calcium analyzed as CaO.

2. The process of claim 1 wherein said catalyst comprises portland cement.

3. The process of claim 1 wherein said catalyst comprises a Type III portland cement.

4. The process of claim 1 wherein said catalyst also comprises a minor amount of an alkali metal.

5. The process of claim 1 wherein after a period of operation in said process the catalyst is regenerated by oxidizing with oxygen.

6. The process of claim 1 wherein the said composition contains less than 5 mol percent free oxygen.

7. The process of claim 1 wherein the said composition contains less than 1 mol percent free oxygen.

8. The process of claim 1 wherein the said reacting is conducted at a temperature of at least 450° C.

9. The process of claim 1 wherein the said reacting is conducted at a temperature of from 450 to 800° C.

10. The process of claim 1 wherein the hydrocarbons contain 4 to 8 carbon atoms.

11. A process for the reduction of carbonyl compounds in a gaseous stream comprising hydrocarbons, uncondensed steam and carbonyl compounds as an impurity in minor amounts which comprises reacting said gaseous stream in vapor phase with a catalyst comprising portland cement in the catalytic surface in contact with the said gaseous stream said cement having from about 15 to 30 percent silicon analyzed as $SiO_2$ from about 2 to 45 percent aluminum analyzed as $Al_2O_3$ and from about 30 to 70 percent calcium analyzed as CaO.

12. The process of claim 11 wherein the said catalyst comprises portland cement Type III.

13. The process of claim 11 wherein the said catalyst also comprises an alkali metal.

14. The process of claim 11 wherein said catalyst comprises potassium.

15. The process of claim 11 wherein the said gaseous stream contains a diolefin and steam.

16. In a process for the production of butadiene-1,3 by a process of oxidative dehydrogenation of a member selected from the group consisting of n-butane and mixtures thereof wherein a reactor effluent is produced comprising butadiene-1,3 and carbonyl compounds as an impurity the improvement comprising reducing said carbonyl compounds by reacting said reactor effluent in vapor phase with a catalyst comprising cement in contact with said reactor effluent said cement having from about 15 to 30 percent silicon analyzed as $SiO_2$ from about 2 to 45 percent aluminum analyzed as $Al_2O_3$ and from about 30 to 70 percent calcium analyzed as CaO.

17. The process of claim 16 wherein said catalyst comprises a Type III portland cement.

References Cited
UNITED STATES PATENTS

| | | | |
|---|---|---|---|
| 3,370,103 | 2/1968 | Callahan et al. | 260—680 |
| 3,437,703 | 4/1969 | Reitmeier et al. | 260—680 |
| 3,557,238 | 1/1971 | Cunningham | 260—680 |

PAUL M. COUGHLAN, JR., Primary Examiner

U.S. Cl. X.R.

260—677 A, 681.5 R

PO-1050
(5/69)

UNITED STATES PATENT OFFICE
CERTIFICATE OF CORRECTION

Patent No. 3,801,669     Dated April 2, 1974

Inventor(s) Harold F. Christmann

It is certified that error appears in the above-identified patent and that said Letters Patent are hereby corrected as shown below:

ol. 1, line 30 reads "butadiene-1,3-isoprene" but should read ---butadiene-1, 3, isoprene---.
ol. 2, line 10 reads "biodegradation" but should read --- by biodegradation---.
ol. 2, line 12 reads "stream" but should read ---steam---.
ol. 2, line 47 reads "CaA" but should read ---CaO---.
ol. 2, line 50 reads "is that is" but should read --- is that it---.
ol. 3, line 17 reads "3 to 4" but should read ---3 or 4---.
ol. 4, line 35 reads " bed to the " but should read --- bed for the---.
ol. 5, line 33 reads " present carrier" but should read ---percent carrier---.
ol. 5, line 40 reads "stimulate" but should read --- simulate---.
ol. 5, line 41 reads " conditions" but should read --- condition---.
ol. 6, line 42 reads " recomal" but should read ---removal---.

Signed and sealed this 18th day of March 1975.

(SEAL)
Attest:

RUTH C. MASON
Attesting Officer

C. MARSHALL DANN
Commissioner of Patents
and Trademarks

Disclaimer 3,801,669.—*Harold F. Christmann*, Seabrook, Tex. PURIFICATION OF HYDROCARBONS. Patent dated Apr. 2, 1974. Disclaimer filed May 5, 1977, by the assignee, *Petro-Tex Chemical Corporation*.

Hereby enters this disclaimer to claims 1, 2, 3, 4, 5, 6, 7, 8, 9, 10, 11, 12, 13, 14, 15, 16 and 17 of said patent.

[*Official Gazette July 26, 1977.*]